United States Patent [19]

Hayes

[11] Patent Number: 5,003,813

[45] Date of Patent: Apr. 2, 1991

[54] METHOD AND APPARATUS FOR MONITORING STORAGE TANK LEAKAGE

[75] Inventor: William V. Hayes, Bandera, Tex.

[73] Assignee: Hayes Separations, Inc., Bandera, Tex.

[21] Appl. No.: 481,899

[22] Filed: Feb. 20, 1990

[51] Int. Cl.⁵ .................... G01M 3/04; G08B 23/00
[52] U.S. Cl. ................................. 73/49.2; 340/605
[58] Field of Search ................ 73/49.2, 40.7; 340/605

[56] References Cited

U.S. PATENT DOCUMENTS

| | | | |
|---|---|---|---|
| 4,305,068 | 12/1981 | Klein | 340/605 |
| 4,644,354 | 2/1987 | Kidd | 73/49.2 X |
| 4,682,156 | 7/1987 | Wainwright | 340/605 X |
| 4,754,136 | 6/1988 | Blakely | 73/49.2 X |
| 4,770,028 | 9/1988 | Flippo, Jr. | 73/49.2 X |
| 4,818,976 | 4/1989 | Schmitt et al. | 73/49.2 X |
| 4,827,246 | 5/1989 | Dolan et al. | 340/605 X |

Primary Examiner—Hezron E. Williams
Assistant Examiner—Joseph W. Roskos
Attorney, Agent, or Firm—Gunn, Lee & Miller

[57] ABSTRACT

The present disclosure is directed to a method and apparatus for monitoring leaks from underground storage tanks and the like. One or more wells of specified depth are formed and each well is lined with plastic pipe which is perforated to admit migratory diffused hydrocarbon molecules from the soil into the pipe. A cap closes the upper end of the pipe and supports a cable which holds an absorbent cartridge. The cartridge has a perforate housing and the housing filled with beads of divinylbenzene which serve as a hydrocarbon, hydrophobic absorbent material. A test procedure is also set forth wherein absorbed hydrocarbons from test cartridges are correlated to background levels and the signature of a stored hydrocarbon product.

23 Claims, 2 Drawing Sheets

METHOD AND APPARATUS FOR MONITORING STORAGE TANK LEAKAGE

BACKGROUND OF THE DISCLOSURE

The present disclosure is directed to a system for monitoring hydrocarbon leaks from an underground storage tank. It is also useful for detection of hydrocarbon invasion at, near or around leaking plumbing systems and the like for handling hydrocarbons. The present disclosure additionally describes a monitoring system which can detect leakage at and around fluid handling systems in petroleum refineries, fuel pump stations, and the like.

Consider, as one example, an underground storage tank which normally stores kerosene, gasoline, aviation fuel, or the like. In particular, consider those tanks which store large quantities of relatively light hydrocarbons. Light hydrocarbons are distinguished from heavier molecules such as those found in lubricants, greases, and the like. The lighter molecules tend to migrate more readily because they are much more volatile. In other words, there is a tremendous difference in the vapor pressure of selected products in contrast with grease and lubricating oils. Heavier oils and greases may need to be monitored, but they are involved with a different type of exposure. A typical storage tank filled with a more volatile mixture of hydrocarbons may well include some very light, highly migratory molecules such as benzene. The light molecules thus have greater permeation into the surrounding environment, and indeed, can be detected in the soil at, near and adjacent an underground storage tank or other fluid handling facility. Consider as an example a service station which dispenses products from underground storage tanks including storage tanks for gasoline, kerosene, aviation fuel, lubricants and the like. After installation, perhaps even a perfect installation, leakage may occur. It is possible that a storage tank will develop a leak. It is also possible that connections with valves, pipes, etc. will develop leaks at the flanges or interconnection points. It is possible also to periodically spill the liquid stored in the tank. Whatever the case, leakage is a recurrent problem in, next to and around a storage tank and particularly an underground storage tank. It is typical to place an underground storage tank and lines running to or from the tank on coarse sand or pea gravel. This protective layer is placed under the tank so that it may settle against the soil which conforms to the shape of the bottom of the tank. Moreover, the underground storage tank, if leaking, may leak at any location on the tank. It is possible to detect large or gross leaks by a loss of product. However, a leak can be quite small, sufficiently small that the leakage loss is simply too small to be detected. It should be noted that there are additional product loss possibilities such as evaporation; that is, the liquid in the tank may evaporate and the fumes escape to atmosphere. That can be sufficiently large that it will obscure the loss rate occasioned by an underground leak.

Many problems can arise with an underground storage tank and the associated leakage. The present disclosure is directed to a system whereby leakage can be detected. Detection is made difficult by virtue of the fact that the leakage will enter the soil unseen and may travel in several directions. Generally speaking, it permeates in all directions with impunity. The vapor phase of hydrocarbons will permeate in all directions. Liquid phase hydrocarbons will travel vertically, with limited wicking horizontally until they contact the saturated zone above the water table, at which point they will begin to travel in the direction of groundwater flow. A complicating factor is the height of the water table in the near vicinity. The water table typically will collect any contact hydrocarbons and carry them on the surface of the water table as a thin film. This, however, may change the direction and degree of permeation into the soil. For instance, the water table may redirect the leaking hydrocarbons in a particular direction or limit penetration in other directions.

The present disclosure is directed to a monitoring system. It contemplates the well drilling with a vertical slotted or perforated casing which is installed in the well. At least one, and usually several such wells are around a storage tank. For easy description, assume that a service station has a pair of adjacent underground storage tanks, each holding 5,000 gallons. Assume further that the sales at the service station will nearly empty both tanks in a week. Thereafter, a large transport truck delivers fuel to the service station to refill the partially or wholly empty tanks. Assume, for purposes of description, that the two large tanks are side by side. Proper monitoring suggests that any leak which is larger than about one liter per hour of the liquid product be detected with a confidence level of ninety percent or greater. To this end, assume that four vertical wells are drilled around the two tanks, conveniently being identified as north, east, south and west wells. The present disclosure sets out an apparatus to be installed in the wells for detection of the leakage. Assume also that there is the possibility of spillage at the surface where the tanks are filled. Again, if spillage can soak into the soil, that also needs to be detected. At the time the detection apparatus is installed, it is sensitive to the permeated hydrocarbons previously in the adjacent soil. The present disclosure sets forth a method for measuring the background level. Assume, for purposes of description, that the tanks have been in place for ten years. Assume further that they do not leak at all. Even so, a background level of a specified few parts per million (ppm) will be established for the four wells. Even when the tanks do not leak, the background levels will persist for a long period of time. Recent leakage must create a different data in contrast with the background level. Moreover, the background level must be determined as to particular types of hydrocarbons. Assume, for example, that the hydrocarbon background level is determined to be 10 ppm. Assume further that a tank is converted from storage of jet fuel to gasoline. The common molecules in the tank can penetrate by diffusion through the surrounding soil at different rates so that characteristic molecules must be determined by a testing technique described hereinafter. Accordingly, fresh or recent leakage can be sorted from background hydrocarbon data in or near the vicinity of the storage tank.

The present method and apparatus therefore sets forth a hydrocarbon spillage or leakage test procedure and equipment for implementing that test procedure. In the preferred embodiment, the hydrocarbon handling equipment, typically a storage tank, but including pipelines, valves, pump stations and the like, is encircled by three or four shallow wells. Wells are preferably placed in the porous backfill that surrounds the hydrocarbon handling equipment, and spaced in a manner that allocates the excavation into approximately equal volumes to minimize the distance that hydrocarbons must migrate to come into contact with a well. They are preferably parallel, drilled to a depth to intercept diffusing hydrocarbon molecules traveling through the soil. They form a circle around the facility. They preferably have a depth of about six feet as a minimum, perhaps thirty feet as a maximum, and do not need to be much deeper than the water table. The depth is tailored to the size of the equipment, usually the underground storage tanks. Background data is obtained as a preliminary step. The data is obtained by placing a perforated casing in each hole and suspending on a flexible cable or line a small buoyant cartridge of absorbent material. The preferred material is divinylbenzene (DVB) which is preferably formed into particles sized in a range of screens. The DVB is an hydrophobic absorbent for hydrocarbons diffusing through the soil. Particles are enclosed in a perforated cylindrical container or canister. They preferably absorb and hold a specified quantity of hydrocarbons. The wells are sealed after placing such a cartridge in the wells, and the cartridges are removed on a fixed schedule such as once per month. The cartridges are tested by forcing air through them at a test facility, the air being directed through a flame so that flame detection indicates the presence of combustible hydrocarbons. Calibration of the flame output provides an indication of concentration, and contrasted with background data, an indication is obtained indicative of a spill or leak.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
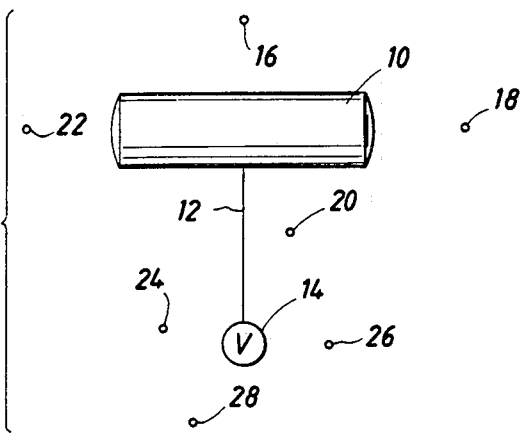
FIG. 1 is a plan view of a hydrocarbon handling equipment including a buried tank, flow line and valve typifying such equipment and which is susceptible to leaks or spillage into the surrounding soil.

Attention is now directed to FIG. 1 of the drawings which shows a storage tank 10 in plan view. The tank can be on the surface, partially buried or completely buried. One or more tanks can be included. The tank 10 is typically a large storage tank holding thousands of gallons of hydrocarbons, typically gasoline, aviation fuel and the like. The tank 10 will be described hereinafter as a buried tank. It typically is an elongate cylindrical tank which has vertical fill pipes, vent pipes and the like, all of which have been omitted from the plan view of FIG. 1 to increase clarity. Moreover, the tank may also connect with a supply line 12 which extends to a valve 14. These components are typical, and are typically installed either above ground, on the ground or buried. They may connect with other pipelines, manifold assemblies and the like. The purposes in showing the components 10, 12 and 14 is to set forth a typical installation subject to leakage. The installation is typical in the sense that it is found often at filling stations, vehicle service barns for large fleets, small hangars for aircraft and the like. The tank 10 typically holds several thousand gallons of gasoline, jet fuel or the like all for the purpose of providing service to a fleet of cars, trucks, construction equipment, aircraft, gasoline powered boats, etc. The valve 14 is typical of the equipment included for connection to supply lines and the like. For purposes of further discussion, it will be assumed that the tank 10 is buried to a depth of fifteen feet at the bottom and the top is about six feet deep. It will be further assumed that the line 12 is also buried and the valve 14 extends to the surface for interconnection with other equipment which has not been shown. It will be further assumed that the surrounding soil is subject to hydrocarbon spillage or leaks from the equipment which will be absorbed into the soil. The surrounding soil in the area of the equipment shown in FIG. 1 can be any type of soil including sand, clay, loam, soil which is perhaps rocky, and which can either be paved over the surface or not.

The present invention contemplates formation of several vertical wells. Four wells are positioned around the tank. For illustrative purposes, the well 16 is located to the north. Another well 18 is located on the east while the well 20 is located to the south. On the west, the well 22 is likewise included. In addition, the valve may be monitored by or tested by one to three separate wells at 24, 26 and 28. It is not normally necessary for the well system to be comprised of more than four wells around a single underground storage tank excavation and its associated piping. One well is usually placed in the piping trench, and three wells are placed in the tank excavation, even if it may contain up to five tanks. If leakage or spillage is detected, the varying concentrations at each of four wells of all the various compounds to be found in the stored fuel that is spilled or leaked will indicate the approximate location of the leak and indicate the type of product. The product is determined by the variety of compounds found. The leak location is estimated by triangulation based on the relative concentration data from the wells. The several wells described to this juncture encircle the equipment. That is to say, the tank 10 is tested for spillage or leakage in all directions. Depending on the porosity of the soil, dependent on the water table, and also dependent on irregularities in the soil (rocks, and the like), the tank 10 is encircled typically by three or four wells, but perhaps more may be required. If duplicate tanks are positioned side by side, it may take only three or four or more wells. Again, this is a scale factor which can be varied depending on circumstances. In similar fashion, the valve 14 is encircled by wells. Since it is more of a point source of potential hydrocarbon spillage, typically only one well is required. But again, it may require a greater number to detect escaping hydrocarbons from the valve 14. Regarding the elongate pipeline 12, it will sometimes be necessary to place one or several wells along its length in the trench. The important point is that sufficient wells be included in the near vicinity of the hydrocarbon handling equipment, and that the equipment be encircled for detection purposes.

The several wells are preferably drilled with a common diameter and are drilled to a common nominal depth. As mentioned earlier, the depth can be about fifteen feet, perhaps as great as thirty feet. Should the tanks permeate the soil deeply, the maximum depth is preferably limited by penetration of the water table. There is no special benefit in penetration of the water table and collection of quantities of water. There is also no benefit in extending the wells deeper than the horizons at which the hydrocarbon molecules might be dissipated. For a given type soil with a given subsurface strata such as a clay layer, limestone bedding rock and other subsurfaces, it may be only necessary to drill the wells to the top of such strata because they serve as a relatively impermeable barrier. In any event, the wells typically are parallel, typically drilled with a common diameter, typically drilled to a common depth taking into account the foregoing factors, and they are typically spaced from the equipment by a distance which is not so great that molecular dissipation through the soil does not reach the wells. The spacing from the tank is thus determined by the interlocking factors mentioned above. One important spacing factor is the volatility of the hydrocarbon. For instance, heavy oils and greases are made of relatively large molecules and do not dissipate readily. By contrast, benzene and other typical solvents of that sort dissipate quite readily. Gasoline, kerosene, aviation fuel and the like also tend to dissipate rapidly.

Figure 2:
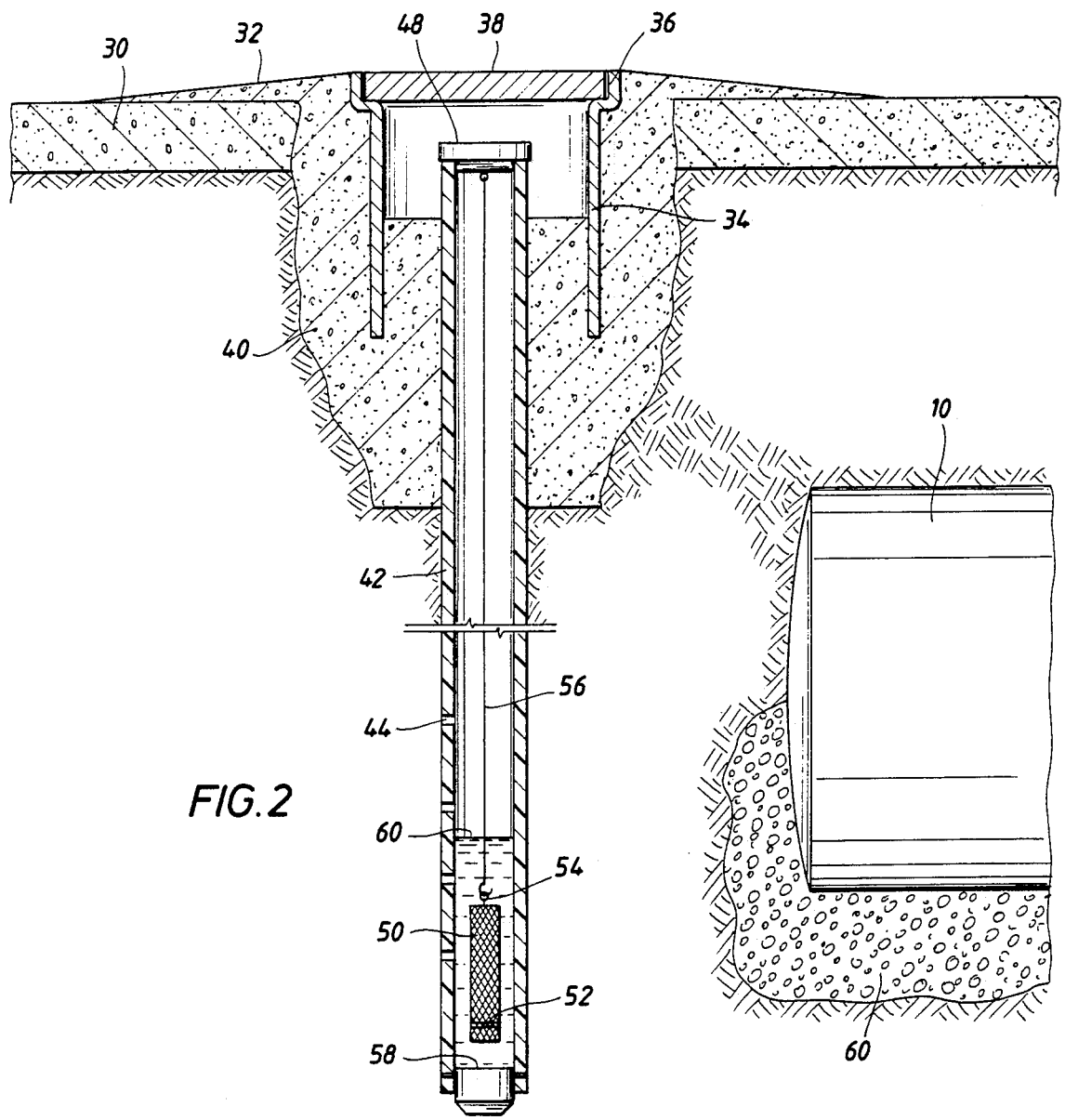
FIG. 2 is a sectional view through a vapor monitoring well where an absorbent cartridge is lowered on a cable in the well from a closure at the top, and further showing a procedure for absorbing hydrocarbon molecules through the surrounding soil.

The construction of the particular wells shown in FIG. 1 should be noted in FIG. 2. There, the surface is presumed to be paved with a concrete layer 30. The concrete layer is typically intended to be level and rain water drains in conventional fashion. In this level region, there is a raised or sloping concrete island 32 built up above the concrete paving 30. This deflects water so that it runs away. Moreover, there is a round buried pipe 34 which terminates at a surrounding top shoulder 36. This shoulder encircles a manhole cover 38 which inserts into the shoulder and mounts flush with the terrain. The vertical pipe 34 extends into the soil by a specified distance. It is preferably anchored in place by pouring backfill concrete 40 outside the manhole. Concrete is poured around the manhole, which has an external flange at its base (not shown), to hold it in place. The manhole encloses the top of the casing, but the casing protrudes from the backfill with no concrete inside the manhole around the casing. The concrete 40 anchors an upstanding casing 42 placed in the well. The casing has a specified diameter, typically up to about four inches in nominal measure, and it is perforated at 44. Lengthwise slots are equally acceptable. Numerous holes are formed through the wall of the pipe. Whatever the circumstance, it is perforated to communicate intimately with the surrounding soil.

At the top end of the pipe 42, a plug 48 closes and seals the pipe. The plug is constructed with a sealing surface on the nether side to engage the top end of the pipe. The plug is shown in FIG. 2 closing the top end of the pipe to prevent intrusion of rain water and the like. The plug 48 supports an absorbent cartridge 50. The cartridge is constructed of particulate absorbent material to be described. It is granular material which is held in a cylindrical container formed of screen material such as stainless steel screen wire. The container thus defines a porous body filled with particles to absorb and hold hydrocarbon molecules. Moreover, a tag 52 is attached for incorporating a number unique to each cylinder. The cylinder is supported by a snap swivel 54 connected with a line 56. The line is sufficiently long to suspend the cylinder near the bottom of the pipe 42. The bottom of the pipe is plugged by a cap or point 58, and the cable 56 is sufficiently long to suspend the cartridge just above the cap. The water table is indicated at 60. The water can rise and fall with the water in the soil. An important feature is the fact that the cartridge 50 is buoyant as will be described. Accordingly, if the water 60 rises, it will lift the cartridge with it. The cable 56 typically is fishing line which is anchored to the cap 48 at the upper end and which connects by a simple snap swivel to the cartridge 50 at the lower end.

FIG. 2 shows the tank 10 off to the side and buried. It will be understood that the drawing scale is different from the hole which is the primary purpose of FIG. 2. In typical installations, the tank 10 is placed on a supportive pad 62 formed of pea gravel, sand or the like which is packed in the hole dug prior to installation of the tank. The tank 10 may leak at any location. Assume that a leak does occur and that it is on an area of the tank which is buried. In that instance, the leaking hydrocarbon materials will be dissipated into the soil. Dissipation is a function of molecule size, porosity of the soil and many other factors. In any case, should hydrocarbon molecules from a spill or leak at any location on the tank 10 enter the soil, there is a possibility that they will migrate to the well shown in FIG. 2. When the molecules enter the well, they are absorbed by the cartridge 50 for subsequent testing as will be described.

Figure 3:
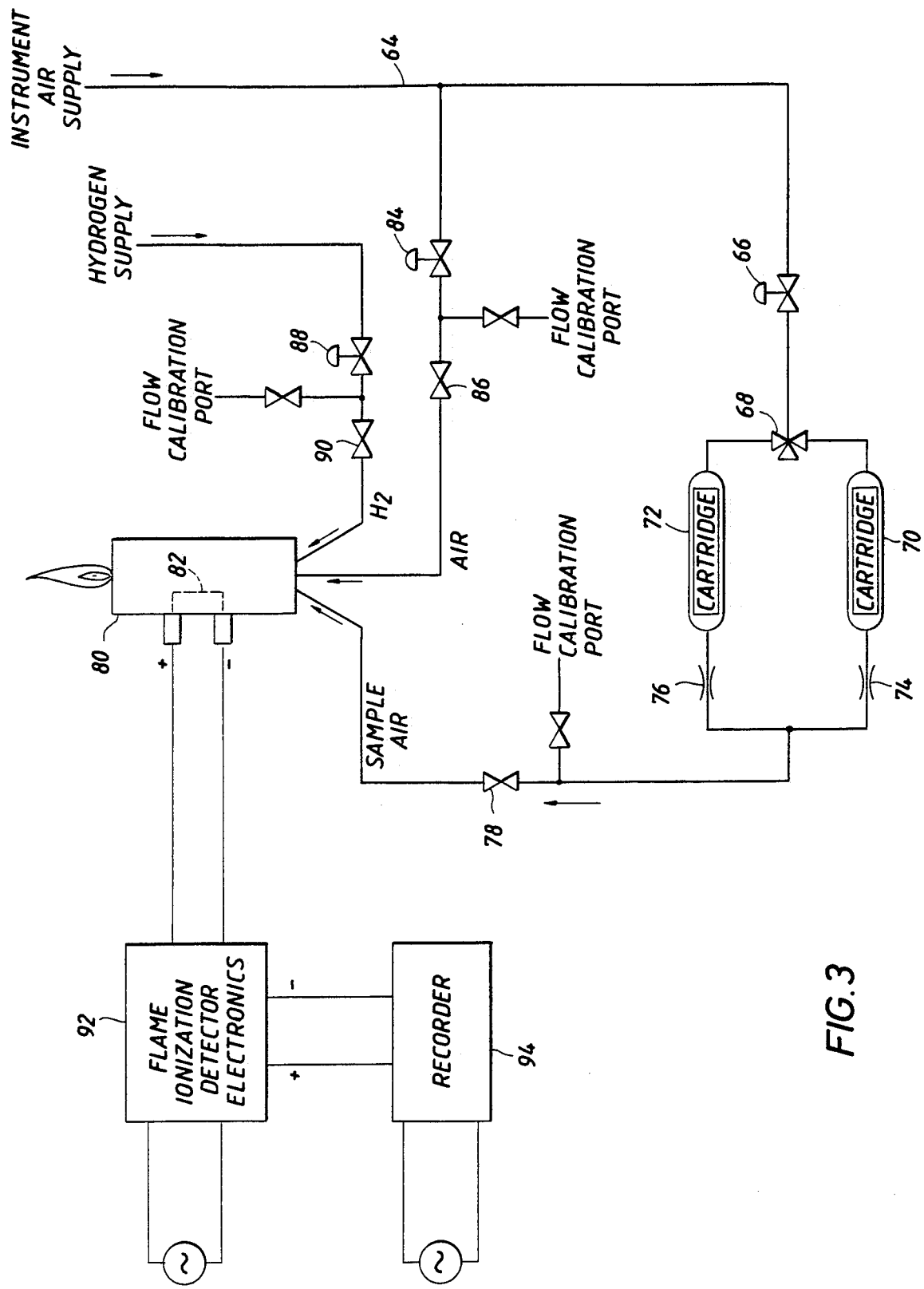
FIG. 3 shows a test system for testing cartridges after removal from the well shown in FIG. 2.

Attention is now directed to FIG. 3 of the drawings for description of the cartridge testing apparatus. Briefly, there is a supply line 64 of air delivered at a regulated pressure through a flow controller 66. It flows through a three way valve 68 and to duplicate sample housings 70 and 72. They in turn connect with flow restrictors 74 and 76. In turn, that delivers flow to a valve 78 which is input to a burner 80. The burner 80 has a hydrogen flame ionization detector 82 therein which forms an output signal. The flame is provided by a flow of air through another flow controller 84, valve 86, and flow line into the burner 80. In addition, there is a supply of hydrogen provided through a flow controller 88 connected with a valve 90 which is input to the burner 80. The hydrogen flame ionization detector 82 is connected with a suitable electronic system 92 which forms an output for a recorder 94. The recorder provides a graph as a function of time of the flame ionization detector signal. This signal from the wire 82 exposed to the flame of the burner 80 is reocred. As will be understood, there are selected flow calibration ports also connected in the system.

WELL INSTALLATION

The first step is to install the absorbent cartridges in wells formed at and around the equipment. Assume, for instance, that an underground storage tank 10 has been in position for several years. Assume further that it is momentarily partially or fully evacuated of hydrocarbons so that it is empty. In this initial state, the first step is to form the several wells around it. They are located so that the tank is encircled. The tank is encircled so that leakage cannot escape in any direction and thereby avoid detection. In any event, the encirclement is set up around the tank 10 and the wells are drilled to a depth that is appropriate. They can be as shallow as about six feet and they can be much deeper dependent on the nature of the soil, the physical dimensions of the tank, subsurface strata such as impermeable clay, and other factors. The several wells are typically drilled at the time of installation, and the wells are cased with the plastic pipe which is shown in FIG. 2. Surface treatment is finished at and around the wells so that surface water does not enter the wells. Water may percolate from the surface and enter the wells beyond a depth of six inches; typically the manhole and/or concrete backfill around well installation provide a seal to a depth of six inches or greater.

An initial set of readings is obtained once the wells are installed. One to three initial sets of readings are obtained once the wells are installed. These are background readings. That is, the cartridges are installed in the wells, preferably one cartridge per well and the cartridges are left for a requisite interval. The cartridges are then removed and readings are obtained from them in the fashion described with FIG. 3. These readings will serve as background readings. That is, they may reflect the presence of hydrocarbons at a specified concentration, i.e, 10 ppm, and this data will serve to distinguish subsequent data. Not only is the background level determined, but the particular hydrocarbon constituents in the background are also determined. The particular hydrocarbon constituents can be determined through the extraction with an air stream of the adsorbed hydrocarbons as mentioned above. The hydrocarbons in the air stream are then separated by the column of a gas chromatograph and burned at the flame ionization detector. For instance, the test procedure shown in FIG. 3 can be used to obtain an indication that a particular type hydrocarbon molecule is present. For instance, if the tank had been previously used to store liquified butane or propane, the diffused hydrocarbon molecules in the soil near the tank will be primarily butane or propane molecules. If the tank subsequently is filled with gasoline, gasoline will typically be indicated by the presence of molecules other than butane or propane molecules. Accordingly, the background data preferably measures the total background in parts per million and also identifies the particular hydrocarbon constituents that are present. This can ordinarily be accomplished through the use of a gas chromatograph as cited above and the flame ionization detector shown in FIG. 3.

Subsequent to obtaining the background readings, the tank is placed in service. It is preferably monitored for leakage by periodically, preferably on a fixed time schedule, removing the cartridges and testing them for hydrocarbon data. A typical test routine is given below.

HANDLING OF THE ABSORBENT CARTRIDGES

The absorbent cartridges are preferably installed with one in each of the several wells. They are quickly and easily installed by obtaining access to the support cable and attaching the cartridge 50 on the cable by means of a snap swivel and lowering the cartridge into the well. Once installed, the well is sealed from the atmosphere, but the perforations into the soil permit light molecules (primarily hydrocarbons) to travel through the soil and collect in the well. The cartridge 50 has an affinity for such hydrocarbons and will absorb the hydrocarbons. The hydrocarbons are absorbed into the particles that make up the cartridge 50. The cartridge 50 is preferably made of beads of material which has a relatively large surface area per weight. The preferred bead is an absorbent bead of divinylbenzene. One such bead is exemplified in U.S. Pat. No. 4,863,494. The size of the bead is subject to variation. Preferably, the beads are in the range of about twenty to fifty screen, U.S. Standard sieve. The beads are preferably spherical and have at least one hundred square meters per gram surface area and as much as five hundred square meters per gram. The beads are loose spheres which are held in a wire mesh cylindrical housing which has a perforate outer shell. The above mentioned DVB beads have an affinity for hydrocarbons. They have a density which is sufficiently light to cause the assembled cartridge to float should water accumulate in the pipe. The cartridge is sufficiently buoyant that it will float on the column of water, if any. The beads are hydrophobic and yet have an affinity for hydrocarbon molecules. Accordingly, when installed, they may contact water, but water contact will not prevent hydrocarbon collection. The cartridge floats on the water and is able to attract and hold the diffused hydrocarbon molecules even should a portion of it be submerged.

DATA COLLECTION

A typical sequence is to collect cartridges from several wells periodically, say, on the same day of the month. By doing so, this permits the cartridges installed in the several wells to collect the hydrocarbon diffusion molecules for one month. The cartridges are periodically removed. Prior to installation, the numbers on the cartridges are recorded to assure tracing so that the data can be associated with a particular well at which data is obtained. Sealed containers are typically glass vials with plastic caps that hold a silicon/teflon septum in place over the top of the vial. The plastic caps have a circular cut-out to expose the septum. The septum may be pierced with a needle to obtain a vapor sample from the vial and the cartridge in the vial. Moreover, the cartridges are stored in sealed containers such as a small glass housing with a threaded cap. They are sealed before installation and after removal. On removal the several cartridges that are collected from particular monitoring wells adjacent the tank 10 are collectively sent for laboratory analysis. Each cartridge is removed and stored in a sealed container as mentioned. They are all transported to the test equipment shown in FIG. 3. Each one is tested using the same test procedure. The data obtained is then compared with previously accumulated data. First of all, the data must be compared with the background data previously obtained. Secondly, the data obtained must also be compared to detect the presence of new molecules collected by the cartridges. For instance, if the tank had been previously used to store propane, the molecules diffusing from that tank in the event of spillage are rather specific. If gasoline, aviation fuel, or other hydrocarbons are placed in the tank, they are typically mixtures having a different characteristic set of molecules. In that sense, a change in hydrocarbon products stored in the tank results in a different signature. The signature can be recognized to establish the presence or absence of leakage from the tank. This data that is collected is analyzed for total hydrocarbon content, i.e, an increase in ppm above the background reading. Also, it is carefully analyzed to assure that the signature of the newly store products in the tank is not observed. It is important to collect the data over a long period of time. Trends develop in the baseline which may be noted over a period of time. Moreover, trends may develop as a result of changes in the water table. There are other trends which may be observed. The data periodically obtained is indicative of excessively large spills or leaks by the equipment. This is useful to initiate repairs and maintenance on the equipment.

While the foregoing is directed to the preferred embodiments, the scope thereof is determined by the claims.

What is claimed is:

1. A method for testing for hydrocarbon leakage near hydrocarbon handling equipment where the method comprises the steps of:
    (a) forming a plurality of shallow holes in the near vicinity of hydrocarbon handling equipment to a depth sufficient for exposure to and patterned to intercept in the holes diffused subsurface hydrocarbon migration;
    (b) positioning in the holes absorbent cartridges capable of selectively absorbing diffused hydrocarbon migration;
    (c) periodically removing the cartridges from the wells and flowing a gas through the cartridges to desorb the hydrocarbons for measuring the absorbed hydrocarbons on the cartridges; and
    (d) comparing the measured hydrocarbons on the cartridges with a specified threshold hydrocarbon measurement to determine hydrocarbon leakage of a specified size from the hydrocarbon handling equipment.

2. The method of claim 1 wherein the holes are at least two feet deep, and no deeper than about two feet below the lowest elevation of the hydrocarbon handling equipment.

3. The method of claim 1 wherein the holes penetrate the soil to the water table.

4. The method of claim 3 wherein the holes are parallel and collectively encircle the hydrocarbon handling equipment.

5. The method of claim 1 wherein the holes are vertically drilled, lined with a perforated casing, and including the step of sealing the holes to exclude surface air entry.

6. The method of claim 5 wherein the holes are closed and opened by a removable cap placed on the holes and above the casing to seal the casing, and including the further step of raising the surface around each hole to direct surface carried liquid away from the holes.

7. The method of claim 1 including the steps of individually suspending absorbent cartridges in the holes with an elongate flexible cable for retrieving and removing the cartridge on the cable.

8. The method of claim 7 including the step of forming the cartridge to be buoyant and maintaining the buoyancy after installation.

9. The method of claim 1 including the preliminary step of calibrating threshold measurements with minimum ambient hydrocarbons in the hydrocarbon handling equipment.

10. The method of claim 9 wherein the measurements are made over a specified interval.

11. The method of claim 1 including the preliminary step of forming a cartridge of sized particulate hydrocarbon absorbing material which material is also hydrophobic and placing the particulate material in a perforated container for admitting air flow into the particulate material.

12. The method of claim 11 including the step of assembling the cartridge such that it is buoyant.

13. The method of claim 11 including the step of placing the particulate material in a screen shaped into a hollow sleeve with closed ends.

14. The method of claim 13 including the step of individually numbering the cartridges.

15. The method of claim 14 including the step of hanging the cartridge in a hole on a connector on a cable.

16. The method of claim 1 including the preliminary step of placing the holes around the equipment to form a circle.

17. The method of claim 1 including the step of measuring hydrocarbons by combustion.

18. The method of claim 17 including the step of directing the gas flow through a flame detector.

19. The method of claim 1 including the step of testing for absorbed hydrocarbons by testing for hydrocarbons in a test not responsive to water.

20. The method of claim 1 including the step of collecting several absorbent cartridges as a batch from plural holes, and testing all the cartridges with each test data being assigned to the hole associated with each of the cartridges.

21. The method of claim 1 including the step of testing cartridges by gas chromatography.

22. A storage tank leak detector apparatus comprising:
    (a) a removable cartridge;
    (b) a well liner perforated to admit gas molecules migrating through said liner installed in a well;
    (c) cover means for said liner; and
    (d) an elongate means supporting said removable cartridge in said liner to absorb and retain gas molecules for analysis after removal of cartridge from the well.

23. A storage tank leak detector apparatus comprising:
    (a) a non-electric removable cartridge;
    (b) a well liner perforated to admit vapor molecules migrating through said liner installed in a well;
    (c) cover means for said liner; and
    (d) an elongate means supporting said removable cartridge in said liner to absorb and retain vapor molecules for analysis after removal of cartridge from the well.

* * * * *